United States Patent
Behles

(10) Patent No.: US 7,470,744 B2
(45) Date of Patent: Dec. 30, 2008

(54) COPOLYMERS USEFUL AS DEMULSIFIERS AND CLARIFIERS

(75) Inventor: Jacqueline Behles, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/402,697

(22) Filed: Apr. 12, 2006

(65) Prior Publication Data
US 2007/0244248 A1    Oct. 18, 2007

(51) Int. Cl.
*C08F 222/14* (2006.01)

(52) U.S. Cl. ............... 524/555; 524/556; 526/303.1; 526/318.43; 526/319; 526/330; 526/335; 526/336; 526/346

(58) Field of Classification Search ........... 524/555, 524/556; 526/303.1, 318.43, 319, 330, 335, 526/336, 346
See application file for complete search history.

(56) References Cited

U.S. PATENT DOCUMENTS

| | | | | |
|---|---|---|---|---|
| 3,438,800 | A | * | 4/1969 | Johnson ............... 427/289 |
| 4,469,615 | A | * | 9/1984 | Tsuruoka et al. ............ 252/180 |
| 5,100,582 | A | | 3/1992 | Bhattacharyya ............ 252/340 |
| 5,239,028 | A | | 8/1993 | Nakagawa et al. |
| 6,025,426 | A | | 2/2000 | Hurlock ............... 524/458 |
| 6,190,561 | B1 | | 2/2001 | Nagan ............... 210/665 |
| 6,646,086 | B2 | | 11/2003 | Sloan |
| 7,115,682 | B2 | * | 10/2006 | Guo et al. ............... 524/556 |
| 7,160,970 | B2 | | 1/2007 | Creamer et al. |

FOREIGN PATENT DOCUMENTS

JP    08188989 A    *    7/1996

* cited by examiner

*Primary Examiner*—Bernard Lipman
(74) *Attorney, Agent, or Firm*—Madan, Mossman & Sriram, P.C.

(57) ABSTRACT

A copolymer useful as a demulsifier or water clarifier may be prepared by polymerizing at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds, under polymerization conditions sufficient to prepare a copolymer. The copolymer may, in some embodiments, be prepared and used as a latex.

19 Claims, No Drawings

COPOLYMERS USEFUL AS DEMULSIFIERS AND CLARIFIERS

BACKGROUND OF THE INVENTION

1. Field of the Invention

The present invention relates to polymers useful in achieving oil and water separation and water clarification. The present invention particularly relates to such polymers that are copolymers.

2. Description of the Prior Art

Chemical demulsification is a convenient and effective method in breaking water in crude oil emulsions. Demulsification may be important in the production of oil and gas for several reasons. One reason is because in the normal course of producing the oil and gas from a subterranean formation, at some point significant amounts of water may be co-produced with the oil and gas. When the water is co-produced as an emulsion, it is usually necessary to break the emulsion prior to transporting the oil to market.

The emulsion may be a natural emulsion due to the presence of naturally occurring emulsifying agents, or the emulsion may be an artifact of the use of additives or recovery processes. For example, the use of steam and caustic injection or combustion processes, for in-situ recovery of heavy oils, may be complicated by the production of viscous emulsions of oil, water and clay. Crude oil is found in the reservoir in association with gas and saline or fresh formation water. A natural emulsion may form simply due to shear and pressure drops at the well head, chokes and valves.

One chemical solution to the problem of emulsification is disclosed in U.S. Pat. No. 5,100,582 to Bhattacharyya. This reference discloses polymeric demulsifiers for breaking water-in-oil emulsions having random structures prepared using varying percentages of acrylic acid, methacrylic acid, ethyl hexyl acrylate, monomethyl acrylate and butyl acrylate as their effective constituents.

Considerable expenditures are made each year for water treatment applications, such as coagulants and flocculants used to clarify raw waters for potable and industrial use. One such application is to clarify process water streams such as water in paper recycling plants and mining wash water circuits. Another application is for clarification of industrial and municipal effluent waters.

One approach to such clarification applications is disclosed in U.S. Pat. No. 6,190,561 to Nagan, in which it is disclosed that a zeolite crystalloid coagulant prepared by using aqueous sodium silicate and sodium aluminate solutions can be used to clarify water by coagulating particulates.

Another solution is disclosed in U.S. Pat. No. 6,025,426 to Hurlock. Therein, hydrophilic cationic copolymers of acrylamide having high molecular weights are disclosed to be useful as raw water clarification aids, emulsion breakers and waste water clarification aids.

SUMMARY OF THE INVENTION

In one aspect, the present invention is a copolymer useful as a demulsifier or clarifier comprising the product of polymerizing: at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds under conditions sufficient to prepare a polymer.

Another aspect of the invention is a process for preparing a copolymer comprising polymerizing: at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds under conditions sufficient to prepare a polymer.

In another aspect, the present invention is a process for demulsifying a production fluid comprising admixing a production fluid and the product of polymerizing: at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds under conditions sufficient to prepare a polymer.

In still another aspect, the present invention is a process for clarifying water having particulate matter suspended therein comprising admixing an aqueous suspension of particulate matter with the product of polymerizing: at least one aromatic monomer having one or more polymerizable double bonds; at least one oleophilic monomer having one or more polymerizable double bonds; at least one ionizable monomer having a polymerizable double bond; and at least one hydrophilic monomer having one or more polymerizable double bonds under conditions sufficient to prepare a polymer.

DESCRIPTION OF THE PREFERRED EMBODIMENTS

In one embodiment, the present invention is a copolymer useful as a demulsifier or clarifier comprising the product of polymerizing at least four monomers, at least one component of which is an aromatic monomer having one or more polymerizable double bonds. Aromatic monomers having one polymerizable double bond include the mono alkenyl arenes. Suitable mono alkenyl arenes useful with the invention include, but are not limited to: styrene, methylstyrene, t-butyl styrene, 4-acetoxystyrene, benzyl methacrylate, 4-chloromethyl styrene, bromostyrene, and 4-methoxystyrene. Other suitable aromatic monomers containing one polymerizable double bond include, but are not limited to: polystyrene monomethacrylate, 9-anthracenylmethyl (meth)acrylate, chlorophenyl acrylate, 4-methacryloxy-2-hydroxybenzophenone, 2-(2'-methacryloxy-5'-methylphenyl)benzotriazole, 2-naphthyl (meth)acrylate, 2-phenylethyl (meth)acrylate, phenyl(meth)acrylate, 1-pyrenylmethyl (meth)acrylate, 9-vinylanthracene, and vinyl benzoate. Aromatic monomers having more than one polymerizable double bond include, but are not limited to: divinylbenzene, cinnamyl (meth)acrylate, 2-cinnamoyloxyethyl(meth)acrylate.

The second component used to prepare the copolymers of the invention is an oleophilic monomer having one or more polymerizable double bonds. Such monomers include, but are not limited to butadiene, isoprene, vinyl acetate, N-cyclohexylacrylamide, poly(propylene glycol)monomethacrylate, methyl-, ethyl-, propyl-, butyl-, t-butyl-, pentyl-, hexyl-, cyclohexyl-, 2-ethylhexyl-, octyl-, isodecyl-,decyl-, lauryl-, undecyl-, stearyl-, or hexadecyl (meth)acrylate, where (meth)acrylate refers to both the methacrylate and acrylate series of monomers. Suitable monomers containing more than one polymerizable double bond include: allyl (meth)acrylate, butanediol di(meth)acrylate, bisphenol A di(meth)acrylate, 1,6-hexanediol di(meth)acrylate, and pentaerythritol diacrylate monostearate.

The third component used to prepare the copolymers of the present invention is an ionizable monomer having a polymerizable double bond. These monomers, sometimes referred to as charged monomers, have at least one alkene bond and at least one ionizable group, such as an acid, amino, or ammonium group. Representative monomers included in this group are, but are not limited to: (meth)acrylic acid, 2-(dimethylamino)ethyl(meth)acrylate, 2-(diethylamino) ethyl(meth)acrylate,2- or 4-vinyl pyridine, 3-(dimethylamino)propyl (meth)acrylamide, 2-carboxyethyl (meth)acrylate, 2-(diisopropylamino)ethyl (meth)acrylate, 3-(dimethylamino)neopentyl(meth)acrylate, 1-vinylimidazole, methacrylamidopropyl trimethyl ammonium chloride, and acryloyloxyethyl trimethyl ammonium chloride.

The fourth component used to prepare the polymers of the present invention is a hydrophilic monomer having one or more polymerizable double bonds. Exemplary monomers in this group include, but are not limited to 2-hydroxyethyl (meth)acrylate, 2-hydroxypropyl(meth)acrylate, poly(ethylene glycol)(meth)acrylate, 4-(meth)acryloylmorpholine, tetrahydrofurfuryl (meth)acrylate, N-vinylcaprolactam, 1-vinyl-2-pyrrolidone, ethylene glycol dimethacrylate, poly (ethylene glycol) dimethacrylate, N,N'-methylene bisacrylamide, N,N'-ethylene bisacrylamide, isopropyl (meth)acrylamide, (meth)acrylamide, N-vinyl formamide, allyl glycidyl ether, N,N-diallyl acrylamide, diallyl maleate, diallylamine, N,N-diethyl acrylamide, diethyl fumarate, 2-methacryloxyethyl glucoside, 2-N-morpholinoethyl(meth)acrylate, glycidyl (meth)acrylate, and acrylonitrile.

The copolymers of the present invention are prepared with all four components of the subject monomers: (1) Aromatic monomers; (2) Oleophilic Monomers; (3) Ionizable Monomers; and (4) Hydrophilic Monomers. The ratios of the component monomers can range from 40:60 to 95:5, wherein the 40 and 95, respectively, represent the sum total mole percent of the (1) aromatic monomers and (2) oleophilic monomers, and 60 and 5, respectively, represent the sum total mole percent of the (3) ionizable monomers and (4) hydrophilic monomers. Each of the monomer classes may be present in the copolymer at a concentration of from about 0.5 to 98.5 mole percent.

In one embodiment of the invention, the monomers are polymerized in water under conditions sufficient to prepare a copolymer, but copolymers of this invention can be prepared with any technique that is known to one of ordinary skill in the art of preparing polymers and copolymers. Methods used to synthesize copolymers include, but are not limited to: emulsion polymerization, microemulsion polymerization, miniemulsion polymerization, solution polymerization, precipitation polymerization, dispersion polymerization, and suspension polymerization. Polymerization methods that can be used to control the type of copolymer, either by control of the polydispersity of the molecular weight of the copolymer or by creating blocks of the monomers within the copolymer or by creating dendrimers, which are referred to as controlled free radical polymerizations are encompassed within this invention. Controlled free radical polymerization methods can include, but are not limited to, ATRP (atom transfer radical polymerization), RAFT (reverse addition-fragmentation transfer polymerization), nitroxide-mediated polymerization, iodide-transfer mediated polymerization, anionic polymerization, cationic polymerization, group transfer polymerization, ring-opening polymerization, and step-growth polymerization. In one embodiment, the preferred process is an emulsion polymerization.

In the preparation of aqueous copolymer dispersions by emulsion polymerization, distinctions are generally made between batch, semibatch, and continuous processes, and different methods of adding the monomers to the reaction vessel are described. For example, in a semibatch process the monomer emulsion is prepared in a separate batching vessel and the emulsion is passed continuously into a polymerization reactor, where it is polymerized. According to a general procedure for a semibatch process, the emulsion feed stream may comprise all of the ingredients used for the emulsion polymerization, such as monomers, water, and additives, with the aqueous monomer emulsion being prepared in a separate batching vessel, referred to as the feed tank.

In other embodiments of the invention, the copolymer is prepared by a continuous process or a batch process. In a continuous process, the monomers are admixed and fed continuously into the reactor while in a batch process; the monomers are admixed and reacted without the further addition of monomer. Any method of emulsion polymerization may be used with the present invention.

The copolymer may be prepared using a catalyst or, in the alternative, the copolymer may be prepared using thermal energy to initiate polymerization. Any method of catalyzing and/or initiating polymerization of an aqueous dispersion of monomers having one or more polymerizable double bonds may be used with the present invention. For example, the monomers may be heated to from about 30° C. to about 95° C. to initiate polymerization, or may be conducted at room temperature with the proper initiating system.

In one embodiment of the invention, after the polymerization is complete, it may be desirable to create a quaternized form of the copolymer. This situation would apply when amine monomers were chosen for the third monomer type. Quaternization can be accomplished by addition of methyl chloride, ethyl bromide, or similar types of materials. The invention is not limited to these two materials and any method of quaternization known to those of ordinary skill in the art of preparing such polymers and copolymers may be used.

In another embodiment of the invention, once the polymerization is complete, post-crosslinking of the copolymer can be done to make it more effective at demulsification or water clarification. Post-crosslinking can be accomplished on copolymers containing an acid monomer, such as acrylic acid or methacrylic acid, by the addition of a divalent or multivalent metal, such as zinc chloride, magnesium oxide, or an aluminum salt. Crosslinking can also be accomplished by the addition of a material containing two or more hydroxyl functionalities, such as cellulose or ethylene glycol, to the acid-containing copolymer under acidic conditions. The addition of a polyamine to the acidic polymer with heat would also provide for post-crosslinking. Furthermore, it is also possible that a Michael Addition reaction of a polyacrylate or diallyl, such as pentaerythritol diacrylate monostearate or diallyl maleate, with amine functionalized copolymers can be done to initiate post-crosslinking. The Michael Addition reaction is appropriate for copolymers that were synthesized containing an amine monomer, such as 2-(dimethylamino)ethyl methacrylate. The invention is not limited to just this monomer, and is inclusive of all amine monomers listed as appropriate ionizable monomers. Another method for crosslinking amine based copolymers is by the addition of a polyepoxide, polyacid, polyisocyanate, or a blocked polyisocyanate. These methods are exemplary and any crosslinking reaction known to one of ordinary skill in the art of preparing polymers and copolymers to be useful may be used.

It is sometimes necessary to form the emulsion using a mixer or other means of mixing. For example, the monomers may be mixed and then an emulsion maintained using bladed mixers, static mixers, and even nozzle mixers, including solid cone nozzles, hollow cone nozzles, fan jet nozzles, smooth jet nozzles, injector nozzles, ejector nozzles, spiral nozzles, impingement jet nozzles, and two-fluid nozzles or an emulsifying baffle.

Any reactor configuration known to those of ordinary skill in the art of preparing emulsion polymers to be useful may be used with the invention. For example, such reactors include, for example, stirred reactors, tank cascades, and unstirred reactors, such as tube reactors.

When the copolymer is prepared using a catalyst, in one embodiment a free-radical catalyst is used. Suitable free-radical polymerization initiators include all those which are capable of setting off a free-radical polymerization. They may comprise either peroxides, e.g., alkali metal peroxodisulfates or organic peroxides, or azo compounds. Use may also be made of combined systems which are composed of at least one organic or inorganic reductant and at least one peroxide and/or hydroperoxide, an example being tert-butyl hydroperoxide with the sodium salt of hydroxymethanesulfonic acid or hydrogen peroxide with ascorbic acid.

Combined catalyst systems may be used which include a small amount of a metal compound which is soluble in the polymerization medium and whose metallic component is able to exist in a plurality of valence states, e.g., ascorbic acid/iron(II) sulfate/hydrogen peroxide, in which in many cases the ascorbic acid may be replaced by the sodium salt of hydroxymethanesulfonic acid, sodium sulfite, sodium hydrogen sulfite or sodium bisulfite and the hydrogen peroxide by tert-butyl hydroperoxide or alkali peroxodisulfates and/or ammonium peroxodisulfate. Preferred initiators are the ammonium or alkali metal salts of peroxosulfates or peroxodisulfates, especially sodium or potassium peroxodisulfate, and V-50 (2,2'-azobis(2-methylpropionamidine) dihydrochloride), an azo initiator. The amount of free-radical initiator used, based on the overall amount of the monomers to be polymerized, is, in one embodiment, from 0.1 to 3% by weight. For controlled free radical polymerization, the initiator or catalyst is dependent upon the method. Using ATRP methods of polymerization usually requires the use of metal salts such as, but not limited to, copper bromide. RAFT polymerization is dependent upon the use of a suitable agent for reversible transfer, such as a dithiocarbamate as well as an azo initiator such as AIBN (2,2'-azobis (2-methylpropionitrile). A suitable initiator for an anionic polymerization is sec-butyl lithium, but the invention is not limited to this initiator.

Additives may be used to prepare the copolymers of the invention. One class of additives which may be useful with the present invention are dispersants. Typical dispersants include emulsifiers and/or protective colloids. These substances are commonly used in amounts of up to 20% by weight in some embodiments, from 0.5 to 15% by weight and in other embodiments, and from 0.5 to 10% by weight in still other embodiments of the invention, based on the weight of the monomers to be polymerized.

Exemplary protective colloids include polyvinyl alcohols, cellulose derivatives, or copolymers based on vinylpyrrolidone. Suitable emulsifiers are, in particular, anionic and nonionic emulsifiers, such as ethoxylated mono-, di- and trialkylphenols, ethoxylates of long chain alkanols, alkali metal salts and ammonium salts of alkyl sulfates, of sulfuric monoesters with ethoxylated alkanols and ethoxylated alkylphenols, of alkylsulfonic acids and of alkylarylsulfonic acids.

Nonionic emulsifiers which can be used include arylaliphatic or aliphatic nonionic emulsifiers, examples being ethoxylated mono-, di- and trialkylphenols (degree of ethoxylation: from 3 to 50, alkyl radical: $C_4$-$C_{10}$), ethoxylates of long-chain alcohols (degree of ethoxylation: from 3 to 50, alkyl radical: $C_8$-$C_{36}$), and also polyethylene oxide/polypropylene oxide block copolymers.

Examples of suitable anionic emulsifiers are alkali metal salts and ammonium salts of alkyl sulfates (alkyl radical: $C_8$-$C_{12}$), of sulfuric monoesters with ethoxylated alkanols (degree of ethoxylation: from 2 to 50, alkyl radical: $C_{12}$-$C_{18}$) and ethoxylated alkylphenols (degree of ethoxylation: from 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{18}$). Suitable anionic emulsifiers also include bis (phenylsulfonic acid) ethers and their alkali metal salts or ammonium salts.

Suitable cationic emulsifiers for use with the present invention include quaternary ammonium halides, e.g., trimethylcetylammonium chloride, methyltrioctylammonium chloride, benzyltriethylammonium chloride, or quaternary compounds of N—($C_6$-$C_{20}$)alkyl)pyridines, N—($C_6$-$C_{20}$) alkyl morpholines or N—($C_6$-$C_{20}$)alkyl imidazoles, e.g., N-laurylpyridinium chloride.

Another class of additives useful with the invention is chain transfer agents. Chain transfer agents may be useful in some embodiments for controlling molecular weight growth. Optional chain transfer agents include mercaptans such as alkyl and/or aryl alkyl mercaptans. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof.

The copolymers of the invention may have a number average molecular weight (Mn) in the range of 5000 to 300,000 daltons. In one embodiment, the copolymer may have a number average molecular weight (Mn) in the range of 10,000 to 100,000 daltons. In still another embodiment, the copolymer may have a number average molecular weight (Mn) in the range of 10,000 to 75,000 daltons.

The monomers and dispersant are, in one embodiment, introduced into the water to form an emulsion prior to or concurrent with the initiation of polymerization. When a chemical initiator is used, it may be supplied in a separate stream or admixed concurrently with the monomers in the reactor.

In the practice of the invention, at least one of each of the four monomer types is used to prepare the copolymers of the invention.

The copolymers of the present invention are particularly useful in production fluid demulsification and water clarification. For the purposes of this invention, a production fluid is the often multiphase admixture of hydrocarbons, water, soluble inorganic materials and particulate matter produced from an oil and gas well. The copolymers of the present invention may be used, optionally in combination with other additives, to treat production fluid downhole, at the surface in a separator, or even down stream from the production well to facilitate the separation of the hydrocarbon from the water in the production fluid to produce a hydrocarbon phase that can be efficiently and cost effectively transferred and refined. In another embodiment, the copolymers of the present invention may be used down hole in conjunction with, for example, a descaler, to penetrate and break emulsions in the producing formation to facilitate the flow of hydrocarbons into an oil well bore. The copolymers of the present invention may be used in any way known to those of ordinary skill in the art of producing oil and gas to be useful.

In clarification applications, the copolymers of the present invention may be used to clarify process or waste water. In one embodiment, the copolymers of the present invention are admixed with waste water to produce a floc which can then be separated from the water using a separator device. In another embodiment, the copolymers of the present invention may be added to process water to reduce turbidity. The copolymers of the present invention maybe used in any way known to those of ordinary skill in the art of treating process and waste water to be useful.

The copolymers of the invention may be desirable used in the form of latexes. In one application, the copolymers are prepared by emulsion polymerization. The resultant latex may be used without additional treatment or modification as both a demulsifier and a water clarification agent.

The copolymers of the invention may also be prepared in other solvents besides water. Any solvent known to be useful to those of ordinary skill in the art of preparing polymer and copolymers may be used. Examples of such solvents include organic solvents, but are not limited to: polyvinylpyrrolidone, N-methyl-2-pyrrolidinone (also called N-methyl-2-pyrrolidone), 2-pyrrolidone, dimethyl sulfoxide, dimethylacetamide, lactic acid, methanol, ethanol, tetrahydrofuran, isopropanol, 3-pentanol, n-propanol, glycerol, butylene glycol (butanediol), ethylene glycol, propylene glycol, mono- and diacylated monoglycerides (such as glyceryl caprylate), dimethyl isosorbide, acetone, dimethylformamide, 1,4-dioxane, polyethylene glycol (for example, PEG4, PEG-8, PEG-9, PEG-12, PEG-14, PEG-16, PEG-120, PEG-75, PEG-150) polyethylene glycol esters (examples such as PEG4 dilaurate, PEG-20 dilaurate, PEG-6 isostearate, PEG-8 palmitostearate, PEG-150 palmitostearate), polyethylene glycol sorbitans (such as PEG-20 sorbitan isostearate), polyethylene glycol monoalkyl ethers (examples such as PEG-3 dimethyl ether, PEG4 dimethyl ether), polypropylene glycol (PPG), polypropylene alginate, PPG-10 butanediol, PPG-10 methyl glucose ether, PPG-20 methyl glucose ether, PPG-15 stearyl ether, propylene glycol dicaprylate/dicaprate, propylene glycol laurate. Other solvents include saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene. Among them, toluene and tetrahydrofuran are preferred. Two or more solvents may be used in combination.

EXAMPLES

The following examples are provided to illustrate the present invention. The examples are not intended to limit the scope of the present invention and they should not be so interpreted. Amounts are in weight parts or weight percentages unless otherwise indicated.

Example 1

A latex is prepared by combining four monomers as shown in the Table in a drip funnel. The drip funnel is connected to a 3-necked 250 mL round bottom flask having a stirrer and a heating mantel. The initiator, water, ionic surfactant, and non-ionic surfactant are added to the flask and stirred under a nitrogen purge for 30 minutes. The monomers in the drip funnel are degassed using a nitrogen purge for 15 minutes. At the expiration of the purge times, the nitrogen purge is terminated and 1-octanethiol is added to the reaction flask, followed by the addition of approximately ⅓ of the monomer volume. The flask contents are heated to 70° C. When the flask contents reach 70° C., slow dropwise addition of the remaining monomer volume is begun. At the conclusion of the monomer addition, the flask contents are held at 70° C. for 2.5 hours. The flask is then cooled in ice-water to approximately 30° C. and the latex is collected without filtration.

The copolymer is tested for molecular weight using GPC against polystyrene standards. The results are displayed below in the table.

The copolymer is used to conduct a field trial at a producing oil well. Identical samples of the copolymer and the demulsifier being used at the field where the well is located are placed into bottles with samples of the production fluid. The bottles are then agitated and allowed to stand. If the copolymer breaks the emulsion as well as or better than the conventional demulsifier, the copolymer is indicated to be good demulsifier. If the copolymer does not perform as well as the conventional demulsifier, the copolymer is indicated to be a poor demulsifier.

Examples 2-5

Example 1 is repeated substantially identically except that the reactants listed in the table are used. Results are also listed in the Table for these examples.

TABLE

| Monomers | Example 1 | Example 2 | Example 3 | Example 4 | Example 5 |
|---|---|---|---|---|---|
| Class 1 | | | | | |
| Styrene | 3.10 g | 2.80 | 3.53 | 3.55 | 3.73 |
| Class 2 | | | | | |
| Isodecyl methacrylate | 6.72 g | | | | |
| Lauryl methacrylate | | 6.83 | | | |
| Butyl Methacrylate | | | 6.76 | | 5.10 |
| 2-Ethylhexyl acrylate | | | | 6.25 | |
| Class 3 | | | | | |
| Methacrylic acid | 2.05 g | 1.85 | | | |
| Acrylic acid | | | 1.96 | 2.00 | 2.07 |
| Class 4 | | | | | |
| 2-Hydroxyethyl methacrylate | 4.63 | | | | |
| Tetrahydrofurfuryl acrylate | | 5.02 | 4.25 | | |

TABLE-continued

| Monomers | Example 1 | Example 2 | Example 3 | Example 4 | Example 5 |
| --- | --- | --- | --- | --- | --- |
| 2-Hydroxyethyl acrylate | | | | 4.70 | 5.60 |
| Water | 106.25 g | 106.25 g | 106.25 g | 106.25 g | 106.25 g |
| Sodium dodecyl sulfate[1] | 0.75 g | 0.75 g | 0.75 g | 0.75 g | 0.75 g |
| Triton X-100[2] | 1.50 g | 1.50 g | 1.50 g | 1.50 g | 1.50 g |
| Vazo 56[3] | 0.17 g | 0.17 g | 0.17 g | 0.17 g | 0.17 g |
| 1-octanethiol[4] | 0.27 g | 0.27 g | 0.27 g | 0.27 g | 0.27 g |
| Mn | 38,100 | 24,300 | 42,800 | Not available | 28,500 |
| Demulsifier Performance | Good | Good | Good | Not tested | Poor |

[1] Ionic Surfactant
[2] Nonionic Surfactant
[3] Initiator
[4] Chain Transfer Agent

What is claimed is:

1. A copolymer useful as a demulsifier or clarifier comprising the product of polymerizing:
    at least one aromatic monomer having one or more polymerizable double bonds;
    at least one oleophilic monomer having one or more polymerizable double bonds;
    at least one ionizable monomer having a polymerizable double bond; and
    at least one hydrophilic monomer having one or more polymerizable double bonds, under polymerization conditions sufficient to prepare a copolymer wherein:
        the at least one aromatic monomer having one or more polymerizable double bonds is selected from the group consisting of: styrene, methylstyrene, t-butyl styrene, 4-acetoxystyrene, benzyl methacrylate, 4-chloromethyl styrene, bromostyrene, 4-methoxystyrene polystyrene monomethacrylate, 9-anthracenylmethyl (meth)acrylate,chlororhenyl acrylate, 4-methacryloxy -2-hydroxybenzorhenone, 2-(2'-methacryloxy-5'-methylphenyl) benzotriazole, 2-naphthyl (meth)acrylate, 2-phenylethyl (meth)acrylate, phenyl (meth)acrylate, 1 -pyrenylmethyl (meth)acrylate, 9-vinylanthracene, vinyl benzoate, Divinylbenzene, cinnamyl (meth)acrylate, 2-cinnamoyloxyethyl (meth)acrylate and mixtures thereof;
        the at least one oleophilic monomer having one or more polymerizable double bonds is selected from the group consisting of: allyl (meth)acrylate, butanediol di(meth)acrylate, bisphenol A di(meth)acrylate, 1,6-hexanediol di(meth)acrylate, pentaerythritol diacrylate monostearate vinyl acetate, N-cyclohexylacrylamide, poly(prorylene glycol) monomethacrylate, methyl (meth)acrylate, ethyl (meth)acrylate, proryl (meth)acrylate, butyl (meth)acrylate, t-butyl (meth) acrylate, pentyl (meth)acrylate, hexyl (meth)acrylate, cyclohexyl (meth)acrylate, 2-ethylhexyl (meth)acrylate, octyl (meth)acrylate, isodecyl (meth)acrylate, decyl (meth)acrylate, lauryl (meth)acrylate, undecyl (meth)acrylate, stearyl (meth)acrylate, hexadecyl (meth)acrylate, and mixtures thereof;
        the at least one ionizable monomer having a polymerizable double bond is selected from the group consisting of: (meth)acrylic acid, 2- (dimethylamino)ethyl (meth)acrylate, 2-(diethylamino)ethyl (meth)acrylate, 2- or 4-vinyl pyridine, 3-(dimethylamino)proryl (meth)acrylamide, 2-carboxyethyl (meth)acrylate, 2-(diisopropylamino)ethyl (meth)acrylate, 3- (dimethylamino) neorentyl (meth)acrylate, 1 -vinylimidazole, methacrylamidopropyl trimethyl ammonium chloride, acryloyloxyethyl trimethyl ammonium chloride, and mixtures thereof; and
        the at least one hydrophilic monomer having one or more polymerizable double bonds is selected from the group consisting of: 2-hydroxyethyl (meth)acrylate, 2-hydroxypropyl (meth)acrylate, poly(ethylene glycol) (meth)acrylate, 4-(meth)acryloylmorpholine, tetrahydrofurfuryl (meth)acrylate. N-vinylcaprolactam, 1 -vinyl-2-pyrrolidone, ethylene glycol dimethacrylate, poly(ethylene glycol) dimethacrylate, N,N'-methylene bisacrylamide, N,N'-ethylene bisacrylamide, isopropyl (meth)acrylamide, (meth) acrylamide, N-vinyl formamide, allyl glycidyl ether, N,N-diallyl acrylamide, diallyl maleate, diallylamine, N,N-diethyl acrylamide, diethyl fumarate, 2-methacryloxyethyl glucoside, 2-N-morpholinoethyl (meth)acrylate, glycidyl (meth)acrylate, acrylonitrile, and mixtures thereof.

2. The copolymer of claim 1 wherein the copolymer comprises at least one aromatic monomer, at least one oleophilic monomer, at least one ionizable monomer and at least one hydrophilic monomer and each class of monomer is present in the copolymer at a concentration from 0.5 to 98.5 mole percent.

3. The copolymer of claim 1 wherein the polymerization conditions comprise an emulsion polymerization process.

4. The copolymer of claim 1 wherein the copolymer is prepared by a polymerization initiated using a catalyst or initiation agent.

5. The copolymer of claim 1 wherein the copolymer is prepared using thermal initiation.

6. The copolymer of claim 5 wherein the polymerization is initiated at a temperature from about 30 ° C. to about 95 ° C.

7. The copolymer of claim 1 wherein the copolymer is prepared in a reactor.

8. The copolymer of claim 1 wherein the copolymer comprises the product of polymerizing the monomers in the presence of a dispersant.

9. The copolymer of claim 8 wherein the dispersant is selected from the group consisting of non-ionic dispersants, anionic dispersants, cationic dispersants, and mixtures thereof.

10. The copolymer of claim 1 wherein the copolymer comprises the product of polymerizing the monomers in the presence of a chain transfer agent.

11. The copolymer of claim 10 wherein the chain transfer agent is n-octyl mercaptan, n-dodecyl mercaptan, t-octyl mercaptan, t-dodecyl mercaptan, tridecyl mercaptan, tetradecyl mercaptan, hexadecyl mercaptan, and mixtures thereof.

12. The copolymer of claim 1 wherein the copolymer is prepared in water.

13. The copolymer of claim 12 wherein the copolymer is a latex.

14. A process for preparing a copolymer comprising polymerizing:
- at least one aromatic monomer having one or more polymerizable double bonds;
- at least one oleophilic monomer having one or more polymerizable double bonds;
- at least one ionizable monomer having a polymerizable double bond; and
- at least one hydrophilic monomer having one or more polymerizable double bonds, under polymerization conditions sufficient to prepare a copolymer wherein:
  - the at least one aromatic monomer having one or more polymerizable double bonds is selected from the group consisting of: styrene, methylstyrene, t-butyl styrene, 4-acetoxystyrene, benzyl methacrylate, 4-chloromethyl styrene, bromostyrene, 4-methoxystyrene rolystyrene monomethacrylate, 9-anthracenylmethyl (meth)acrylate, chlororhenyl acrylate, 4-methacryloxy -2-hydroxybenzorhenone, 2-(2'-methacryloxy-5'-methylrhenyl)benzotriazole, 2-naphthyl (meth)acrylate, 2-phenylethyl (meth)acrylate, phenyl (meth)acrylate, 1 -pyrenylmethyl (meth)acrylate, 9-vinylanthracene, vinyl benzoate, divinylbenzene, cinnamyl (meth)acrylate, 2-cinnamoyloxyethyl (meth)acrylate and mixtures thereof;
  - the at least one oleophilic monomer having one or more polymerizable double bonds is selected from the group consisting of: allyl (meth)acrylate, butanediol di(meth)acrylate, bisphenol A di(meth)acrylate, 1,6-hexanediol di(meth)acrylate, pentaerythritol diacrylate monostearate vinyl acetate, N-cyclohexylacrylamide, poly(propylene glycol) monomethacrylate, methyl (meth)acrylate, ethyl (meth)acrylate, propyl (meth)acrylate, butyl (meth)acrylate, t-butyl (meth) acrylate, pentyl (meth)acrylate, hexyl (meth)acrylate, cyclohexyl (meth)acrylate, 2-ethylhexyl (meth)acrylate, octyl (meth)acrylate, isodecyl (meth)acrylate, decyl (meth)acrylate, lauryl (meth)acrylate, undecyl (meth)acrylate, stearyl (meth)acrylate, hexadecyl (meth)acrylate, and mixtures thereof;
  - the at least one ionizable monomer having a polymerizable double bond is selected from the group consisting of: (meth)acrylic acid, 2- (dimethylamino)ethyl (meth)acrylate, 2-(diethylamino)ethyl (meth)acrylate, 2- or 4-vinyl pyridine, 3-(dimethylamino)propyl (meth)acrylamide, 2-carboxyethyl (meth)acrylate, 2-(diisopropylamino)ethyl (meth)acrylate, 3- (dimethylamino) neopentyl (meth)acrylate, 1 -vinylimidazole, methacrylamidopropyl trimethyl ammonium chloride, acryloyloxyethyl trimethyl ammonium chloride, and mixtures thereof; and
  - the at least one hydrophilic monomer having one or more polymerizable double bonds is selected from the group consisting of: 2-hydroxyethyl (meth)acrylate, 2-hydroxypropyl (meth)acrylate, poly(ethylene glycol) (meth)acrylate, 4-(meth)acryloylmornholine, tetrahydrofurfuryl (meth)acrylate, N-vinylcarprolactam, 1 -vinyl-2-pyrrolidone, ethylene glycol dimethacrylate, poly(ethylene glycol) dimethacrylate, N,N'-methylene bisacrylamide, N,N'-ethylene bisacrylamide, isopropyl (meth)acrylamide, (meth)acrylamide, N-vinyl formamide, allyl glycidyl ether. N,N-diallyl acrylamide, diallyl maleate, diallylamine, N,N-diethyl acrylamide, diethyl fumarate, 2-methacryloxyethyl glucoside, 2-N-morpholinoethyl (meth)acrylate, glycidyl (meth)acrylate, acrylonitrile, and mixtures thereof.

15. The process of claim 14 wherein the polymerization is performed in water.

16. A process for demulsifying a production fluid comprising admixing a production fluid and the copolymer of claim 1.

17. A process for clarifying water having particulate matter suspended therein comprising admixing an aqueous suspension of particulate matter with the copolymer of claim 1.

18. The copolymer of claim 1 wherein the copolymer has a molecular weight (Mn) of from 5,000 to 75,000 daltons.

19. The process of claim 14 wherein the copolymer has a molecular weight (Mn) of from 5,000 to 75,000 daltons.

* * * * *